United States Patent [19]
Ginetti et al.

[11] Patent Number: 5,751,596
[45] Date of Patent: May 12, 1998

[54] AUTOMATED SYSTEM AND METHOD FOR IDENTIFYING CRITICAL TIMING PATHS IN INTEGRATED CIRCUIT LAYOUTS FOR USE WITH AUTOMATED CIRCUIT LAYOUT SYSTEM

[75] Inventors: Arnold Ginetti, Antibe, France; Athanasius W. Spyrou, San Jose, Calif.

[73] Assignee: VLSI Technology, Inc., San Jose, Calif.

[21] Appl. No.: 495,194

[22] Filed: Jul. 27, 1995

[51] Int. Cl.$^6$ ................................................. G06F 17/50
[52] U.S. Cl. ......................... 364/491; 364/489; 364/490
[58] Field of Search ........................... 395/500; 364/488, 364/489, 490, 491

[56] References Cited

U.S. PATENT DOCUMENTS

| | | | |
|---|---|---|---|
| 5,396,435 | 3/1995 | Ginetti | 364/489 |
| 5,402,357 | 3/1995 | Schaefer et al. | 364/490 |
| 5,426,591 | 6/1995 | Ginetti et al. | 364/489 |
| 5,461,576 | 10/1995 | Tsay et al. | 364/490 |
| 5,475,607 | 12/1995 | Apte et al. | 364/489 |
| 5,507,029 | 4/1996 | Granato et al. | 395/500 |
| 5,521,837 | 5/1996 | Frankle et al. | 364/491 |
| 5,541,849 | 7/1996 | Rostoker et al. | 364/489 |
| 5,544,066 | 8/1996 | Rostoker et al. | 364/489 |
| 5,553,000 | 9/1996 | Dey et al. | 364/488 |
| 5,572,717 | 11/1996 | Pederson | 364/488 |
| 5,581,738 | 12/1996 | Dombrowski | 395/500 |
| 5,596,505 | 1/1997 | Steinweg et al. | 364/490 |

OTHER PUBLICATIONS

Experiments With A Program Timing Tool Based On Source–Level Timing Schema; Chang Yun Park et al.; IEEE; 1990; pp. 72–81.

"Specification and Analysis of Timing Constraints in Signal Transition Graphs"; P. Vanbekbergen et al.; IEEE; 1992; pp. 302–306.

*Primary Examiner*—Kevin J. Teska
*Assistant Examiner*—Tyrone V. Walker
*Attorney, Agent, or Firm*—Gary S. Williams; Flehr Hohbach Test Albritton & Herbert LLP

[57] ABSTRACT

A computer aided design system converts system level timing constraints to the minimum number of path-based timing constraints necessary to represent the same timing constraints as the system level timing constraints. Using a data structure for each node of the circuit, signal arrival times and required arrival times for each node are generated for each high level timing constraint, and the worst slack time is identified for each node. Then, a node with a worst slack time is selected, the constraint associated with that worst slack time is identified, and then a worst case path from a start node of the identified constraint through the selected node to an end node of the identified constraint is determined. The start and required signal arrival times associated with the identified constraint's start and end nodes in the determined path are also identified. Then the determined path, and the maximum signal traversal time associated with that path are written to a path-based constraint data structure, and all the nodes in the determined path are marked as having been processed. Additional path-based constraints are generated, each time using an unmarked node having a worst remaining slack time, until all nodes in the circuit netlist having identified slack times have been included in at least one path-based constraint. The set of path-based constraints are used by a circuit layout generator to generate a circuit layout that meets the specified timing constraints.

3 Claims, 5 Drawing Sheets

AUTOMATED SYSTEM AND METHOD FOR IDENTIFYING CRITICAL TIMING PATHS IN INTEGRATED CIRCUIT LAYOUTS FOR USE WITH AUTOMATED CIRCUIT LAYOUT SYSTEM

The present invention relates generally to computer aided design systems which facilitate the design of integrated circuits and particularly to computer aided design methods and systems for automatically modifying logic circuit designs to reduce the critical signal path delay times.

BACKGROUND OF THE INVENTION

Virtually all complex integrated circuits are designed with the use of computer aided design (CAD) tools. Some CAD tools, called simulators, help the circuit designer verify the operation of a proposed circuit. Another type of CAD tool, called a silicon compiler (also sometimes known as automatic layout or place and route systems), generates the semiconductor mask patterns from a detailed circuit specification. Other CAD tools modify an existing circuit specification to optimize it for speed, layout area, or both.

Netlists

The detailed circuit specification used by silicon compilers, circuit simulators and other circuit design optimization tools is often called a netlist, and comprises a list of circuit components and the interconnections between those components. Circuit components are also known as "cells" where each cell in a specific circuit library has both a logical representation, as well as a circuit layout representation.

The netlist defines all of the interconnections between the components of the circuit. Each "signal" which interconnects two or more cells, or which represents an input or output for the entire circuit, is actually a node in the circuit which has been assigned a name. The terms "net," "signal" and "node" are often used interchangeably.

In addition, the netlist specifies the nature of its components by specifying a cell name for each component. The cell name, in turn, specifies or points to a particular circuit in a predefined library of cells.

Circuits can also be represented by a list of statements in a Hardware Description Language (HDL), such as Verilog or VHDL. The HDL circuit description is then converted into a specific circuit netlist either by an engineer or by an HDL circuit synthesizer using a specified set of library cells.

Timing Constraints and Critical Paths

Timing driven circuit layout generators are used to place and route circuit designs according to specified timing constraints. Such layout generators attempt to reduce wiring length, and thus wiring capacitance, on nodes that are subject to tight timing constraints. Such timing driver circuit layout generators accept as inputs a netlist, and "digested" timing constraint information, and output a circuit layout corresponding to the netlist and the timing constraints.

"Digested" timing constraints can be divided into two main categories: net slack constraints, and path-based constraints. Net slack constraints are used to indicate how much "slack" is available on a net (i.e., a node of the circuit). Path-based constraints are used to indicate how much delay is available for individual paths through a design. More specifically, a path-based constraint is composed of:

a path that is a chain of interconnected netlist instances; and a required time value for that path, specifying the maximum signal propagation time through that chain.

In both cases, the delay values are based on the system level user-specified timing constraints, such as signal arrival times on external input connectors and/or clock frequencies. In this document, only path-based constraints will be addressed. However, since the identification of path-based constraints involves the computation of the slack on certain nodes, the following explanation of slack computation is provided.

The arrival time A of a generated signal at a node J of a circuit is typically computed as follows:

$$A(J) = MAX_{y \in i(J)}(A(y) + D(y,J))$$

where i(J) is the set of inputs to the cell or gate that generates the signal on node J and D(j,J) is the delay from input node y to node J. This computation starts at the input nodes and progresses toward the specified node J. Thus the computed arrival time for any specified node J is the worst case signal arrival time based on both a specified set of input signal times and the longest signal paths from the input nodes to node J.

The required time R at the same node J (i.e., the latest time at which the generated signal can arrive and meeting the specified timing requirements) is computed as follows:

$$R(J) = MIN_{z \in o(J)}(R(z) - D(z,J))$$

where o(J) is the set of nodes driven by a cell to which the signal on node J is an input. Thus required times are computed by working from the circuit's output nodes back toward the input nodes, and each node's required time is the earliest time required in order for the signal on the next successive node toward the output of the circuit to meet its timing requirements. The arrival times of signals at the circuit's inputs as well as the required times at the circuit's outputs are specified by the circuit designer. The required signal times and signal arrival times for the circuit's internal nodes are typically computed using the above equations.

In a preferred embodiment, the timing information in the cell library for a particular cell represents the timing delay from each input put to each output pin. A timing path between an input port i and an output port j of a particular gate is approximated by a minimum gate propagation delay value Pij and a load dependent delay value Rij known as the ramp value. Each input port and each output port is also labeled by its capacitance C. The delay through a gate G from input port i to output port j is thus computed as follows:

$$D_{ij} = P_{ij} + R_{ij} * \left( \sum_{x=1}^{n} C_x + C_r + n*C_c \right)$$

where $C_x$ is the input capacitance of the $x^{th}$ gate driven by gate G, $C_r$ is a user specified routing capacitance representing an estimated capacitance of the gate's output node, $C_c$ is a user specified connection capacitance, and n is the number of input ports of other gates to which the gate output is connected.

The slack S(J) at each node J of the circuit is defined as the difference between the required time and the arrival time for that node:

$$S(J) = R(J) - A(J)$$

Thus, if the slack S(J) for a node is positive in value, the timing requirements of that node are satisfied. However, if the slack S(J) of a node is negative, that means that the circuit has a potential timing problem.

The problem that the present invention solves is as follows. An integrated circuit may have specified timing constraints, which define the maximum allowable amount of time that between receipt of a particular set of input signals and the generation of output signals on specified output nodes of the circuit. In order to ensure that the circuit layout generator generates a circuit layout that meets all user specified timing constraints, as much path constraint information as possible should be provided to the circuit layout generator. However, there is a tradeoff between the number of specified timing path constraints and the amount of computer resources needed to generate a circuit layout. Today's circuit designs are so complex that reporting all timing path constraints in a design would be impractical because (A) the list of paths would be impractically large, (B) the CPU time needed to generate the list of paths would be impractically large, (C) the amount of CPU time needed by the circuit layout generator to process the list of paths would be impractically large.

It is the goal of the present invention to provide an automated circuit layout system that includes a "netlist annotator" which converts system level user-specified timing constraints into the smallest number of necessary path-based timing constraints in order to correctly drive a circuit layout generator.

A related goal of the present invention is to generate a set of path-based timing constraints such that (A) each "design constrained node" (i.e., each node that is subject to at least one timing constraint) will be covered by the worst path-based constraint passing through that node, and (B) the number of path-based constraints generated is minimized.

Another goal of the present invention is to generated the minimum set of critical timing paths using as little computational resources as possible.

SUMMARY OF THE INVENTION

In summary, the present invention is a computer aided design system and method for automatically generating a circuit layout for a specified circuit netlist that meets a specified set of timing constraints. The computer aided design system converts system level timing constraints to the minimum number of path-based timing constraints necessary to represent the same timing constraints as the system level timing constraints. The path-based timing constraints are generated by storing in a data structure for each node of the circuit signal arrival times and required arrival times, and identifying the worst slack time for each node.

Then, a node with a worst slack time is selected, the constraint associated with that worst slack time is identified, and then a worst case path from a start node of the identified constraint through the selected node to an end node of the identified constraint is determined. The start and required arrival times associated with the identified constraint's start and end nodes in the determined path are also identified. Then the determined path, and the signal traversal time associated with that path are written to a path-based constraint data structure, and all the nodes in the determined path are marked as having been processed. Additional path-based timing constraints are generated, each time using an unmarked node having a worst remaining slack time, until all nodes in the circuit netlist having identified slack times have been included in at least one path-based constraint.

Each path-based timing constraint indicates a path through the circuit specified by the circuit netlist, and a maximum traversal time for a signal traveling on that path. The set of path-based constraints are used by a circuit layout generator to generate a circuit layout that meets the specified timing constraints.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
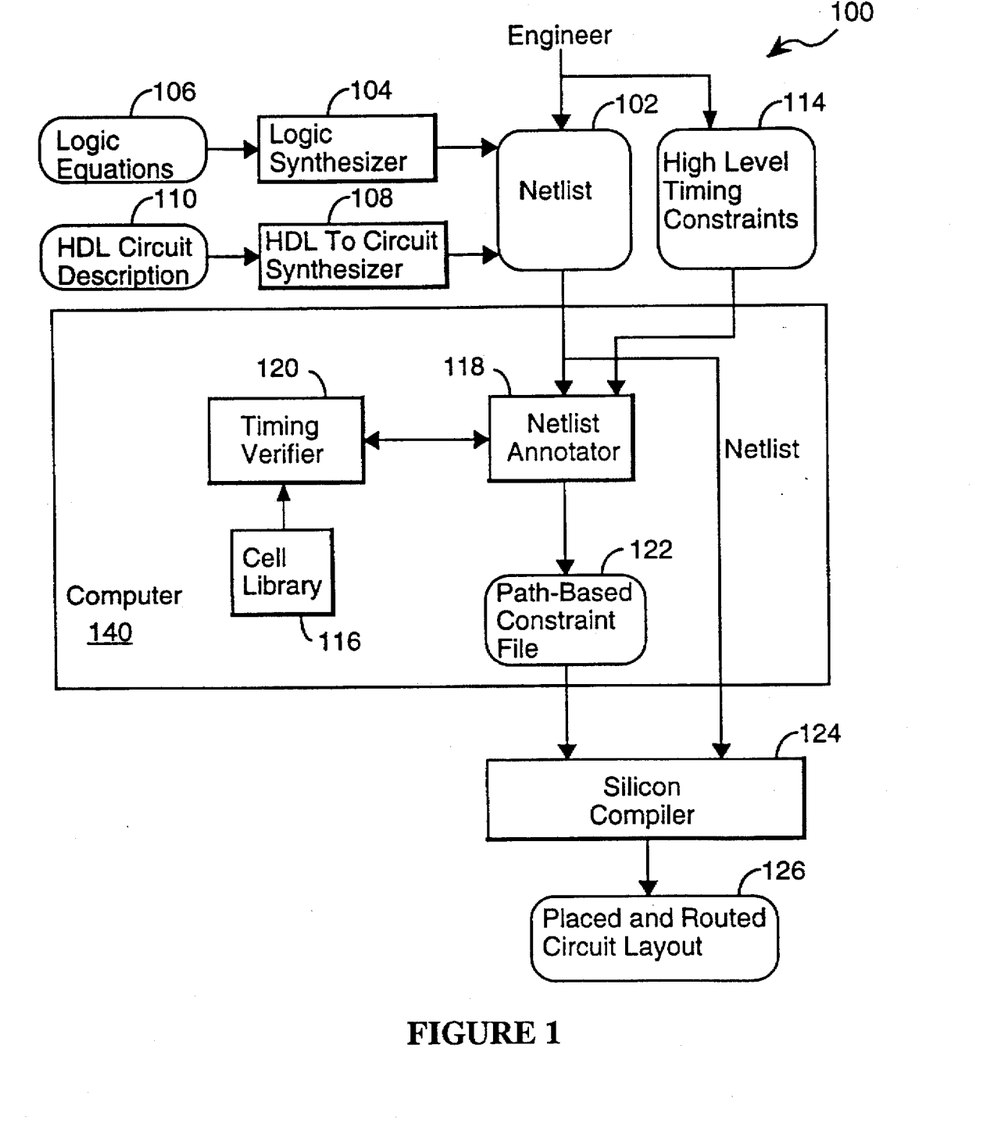
FIG. 1 is a flow diagram showing the flow of information in a preferred embodiment of the present invention.
Figure 2:
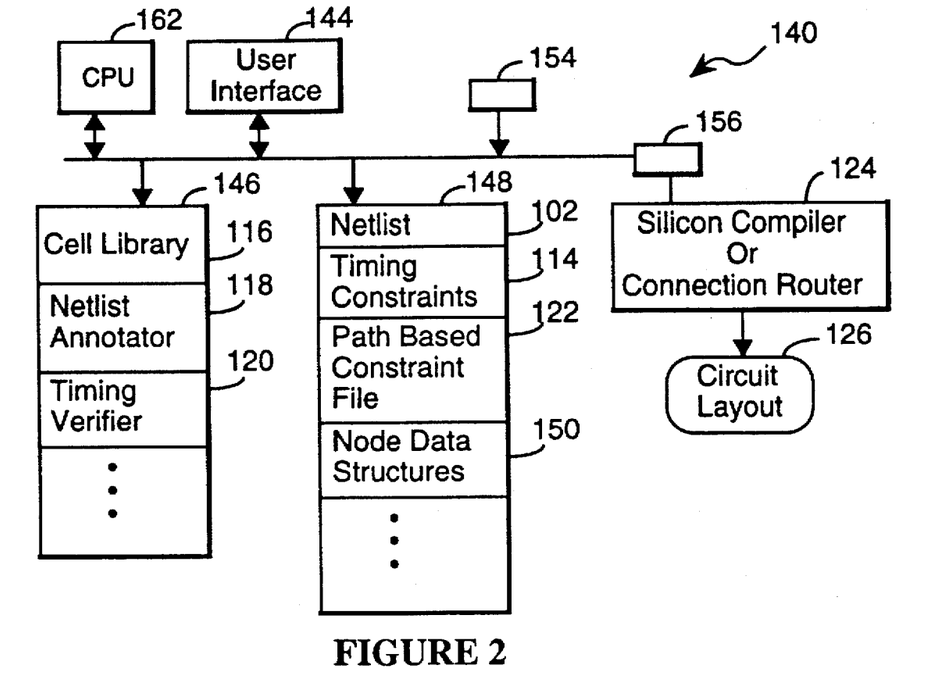
FIG. 2 is a block diagram of a computer aided design system incorporating the present invention.

Referring to FIGS. 1 and 2, the computer aided circuit design (CAD) system 100 of the present invention receives a circuit netlist 102 from any of a number of sources. For instance, the circuit netlist 102 may be directly generated and input by an engineer, or it may be generated by a logic synthesizer 104 from a set of logic equations 106 prepared by an engineer, or it may be generated by an HDL circuit synthesizer 108 from an HDL circuit description 110 written by an engineer.

The engineer will also generally specify a set of high level timing constraints 114 for the circuit as well as a cell library 116 for implementing the specified circuit with a particular set of circuit cells. The high level timing constraints 114 are typically specified by the engineer as a set of input signal timing values (i.e., input nodes and a start time for each input node) and a set of output signal timing values (i.e., output nodes and a required arrival time for each output node). The delay parameters of each cell in the circuit netlist are obtained from the specified cell library 116, as discussed above.

Netlist annotator procedure 118, in conjunction with timing verifier 120, generates a set of path-based constraints from the circuit netlist 102 and the high level timing constraints. The path-based constraints are stored in a path-based constraint file 122, and then passed to a timing driven silicon compiler 124 along with the circuit netlist 102. The silicon compiler 124 generates a circuit layout 126 that satisfies the timing constraints specified in the path-based constraint file 122, or an error message if it is unable to generate a circuit layout meeting those timing constraints.

As shown in FIG. 2, the preferred embodiment is implemented on a computer workstation 140 having a CPU 142, a user interface 144, disk or other memory storage 144 for storing the cell library 116, netlist annotator 118 and timing verifier 120, as well as other software modules. Random access memory 148 is used to store arrays of data such as the specified circuit netlist 102, an array of system level timing constraints 114, a file 122 of the path-based timing constraints generated by the netlist annotator 118, and node data structures 150 used during the process of generating the path-based timing constraints.

Data such as the netlist 102, high level timing constraints 114 and the like may be entered either through an input port 154 or through the user interface 144. When the path-based constraints for the specified netlist have been determined, the resulting file 122 is transmitted via port 156 to a silicon compiler or connection routing program 122.

The silicon compiler 124 may be any one of several commercially available silicon compilers that utilize path-based timing constraints, including the Compass Design cellCOmplier, by Compass Design Automation of San Jose, Calif.

Figure 3:
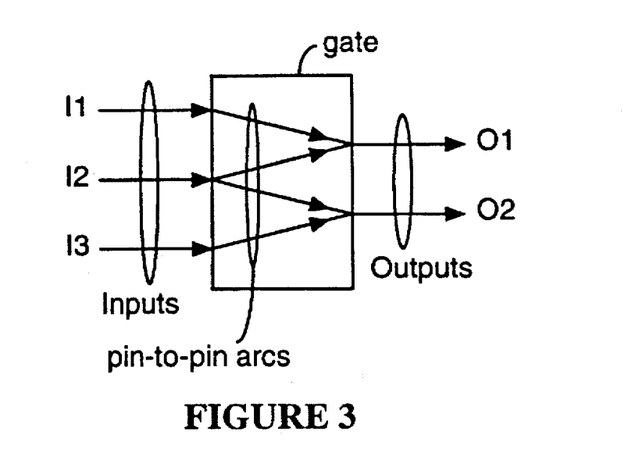
FIG. 3 schematically depicts the features of one circuit element or gate that are used in the path-based timing constraint generation procedure of the present invention.

Referring to FIG. 3, for purposes of handling timing constraints, each circuit element in a specified circuit is treated as a "box" or "gate" having inputs, outputs, pin-to-pin arcs connecting various ones of the input to various ones of the outputs, and a time delay value associated with each pin-to-pin arc. No other characteristics of the circuit elements are relevant to the procedure for generating path-based timing constraints.

Figure 4:
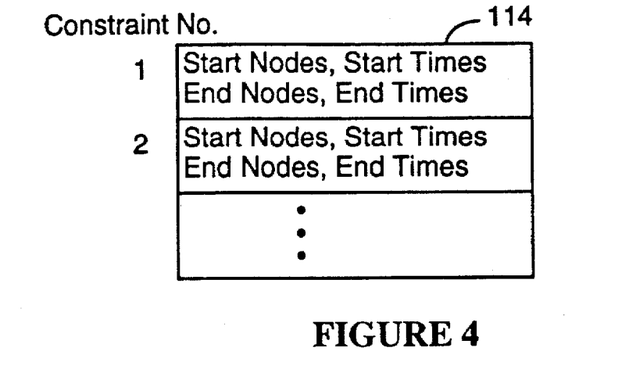
FIG. 4 depicts a data structure for representing system level timing constraints.

As shown in FIG. 4, the system level timing constraints are stored in a data structure 114 that represents multiple sets of distinct timing constraints. Each distinct constraint is represented by a set of start nodes (otherwise called input nodes), a start time for each such start node, a set of end nodes (otherwise known as output nodes) and a required arrival time for each such end node. Multiple system level timing constraints are often used to represent distinct timing requirements associated with a specified circuit's performance.

Figure 5:
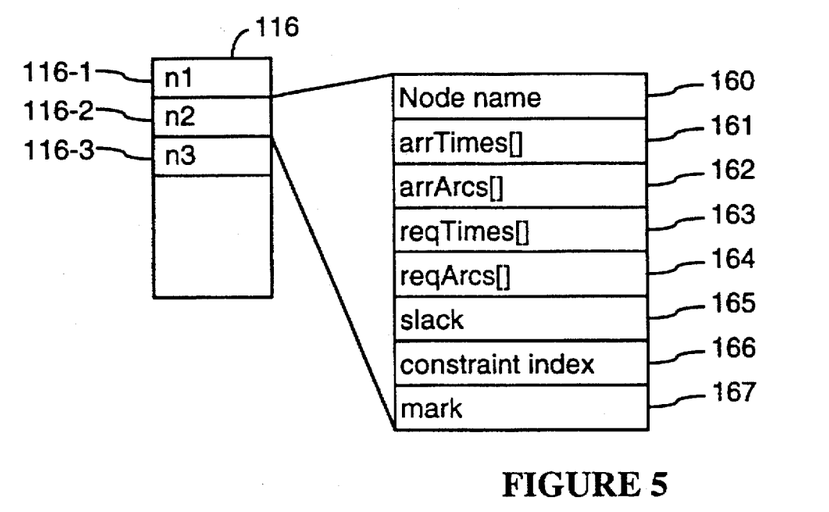
FIG. 5 depicts a "node" data structure for storing information for each circuit node used in the path-based timing constraint generation procedure of a preferred embodiment of the present invention.

Referring to FIG. 5, for each node in the specified circuit, a node data structure 116 is maintained. That node data structure stores:

- a node name 160 (i.e., the name or symbol for the node in the specified circuit netlist);
- an array 161 of arrival times, arrTimes, (including one for each distinct system level constraint);
- an array 162 of arrival (upstream) pin-to-pin arcs, arrArcs, including one arc for each such arrival time;
- an array 163 of required arrival times, reqTimes, including one for each distinct system level constraint;
- an array 164 of downstream pin-to-pin arcs, reqArcs, including one for each such required arrival time;
- a slack value 165;
- a constraint index value 166; and
- a mark flag 167.

The functions of the data structures mentioned above will be explained with reference to the path-based timing constraint generation procedure of the preferred embodiment.

Figure 6:
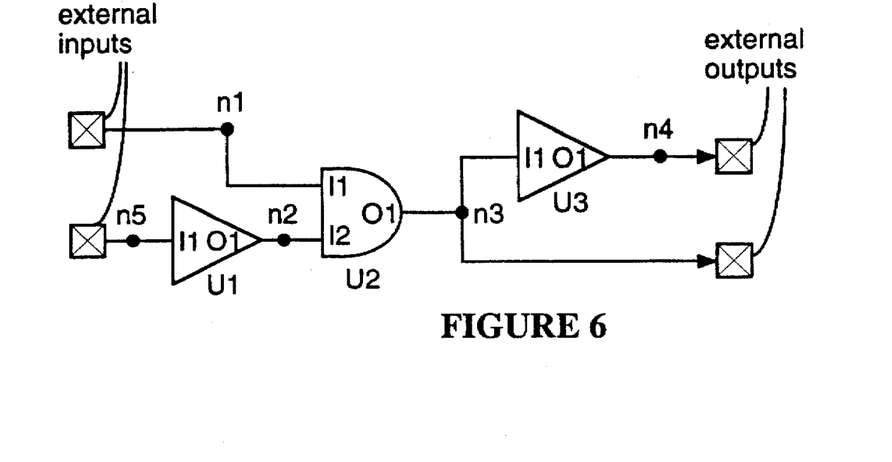
FIG. 6 schematically depicts a simple circuit that will be used to demonstrate operation of the present invention.

FIG. 6 shows a simple circuit that will be used in the following explanation of the path-based timing constraint generation procedure of the preferred embodiment.

Path-based Timing Constraint Generation Procedure

Figure 7A:
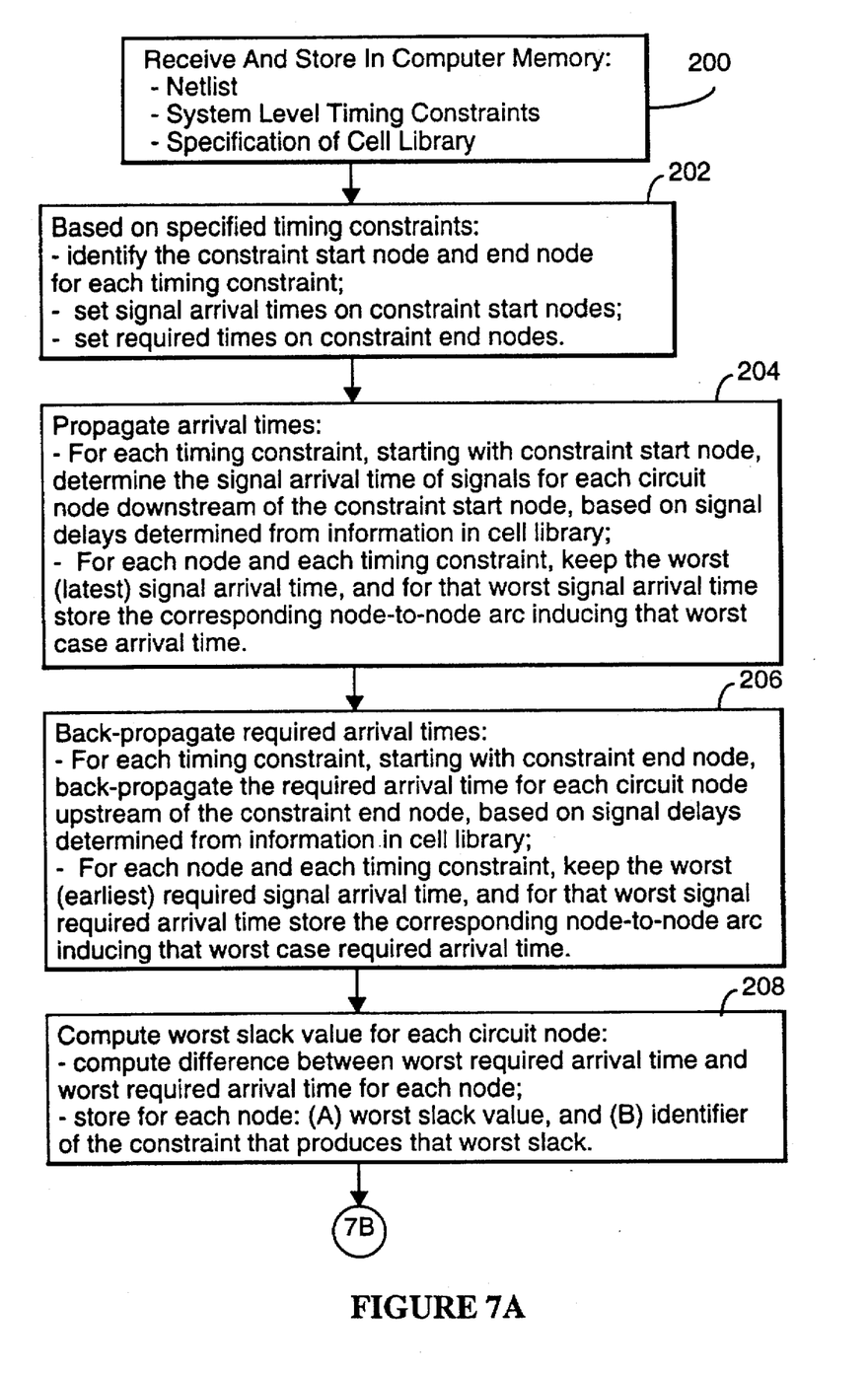
FIGS. 7A and 7B are a flow chart of the methodology used in a preferred embodiment of the present invention.
Figure 7B:
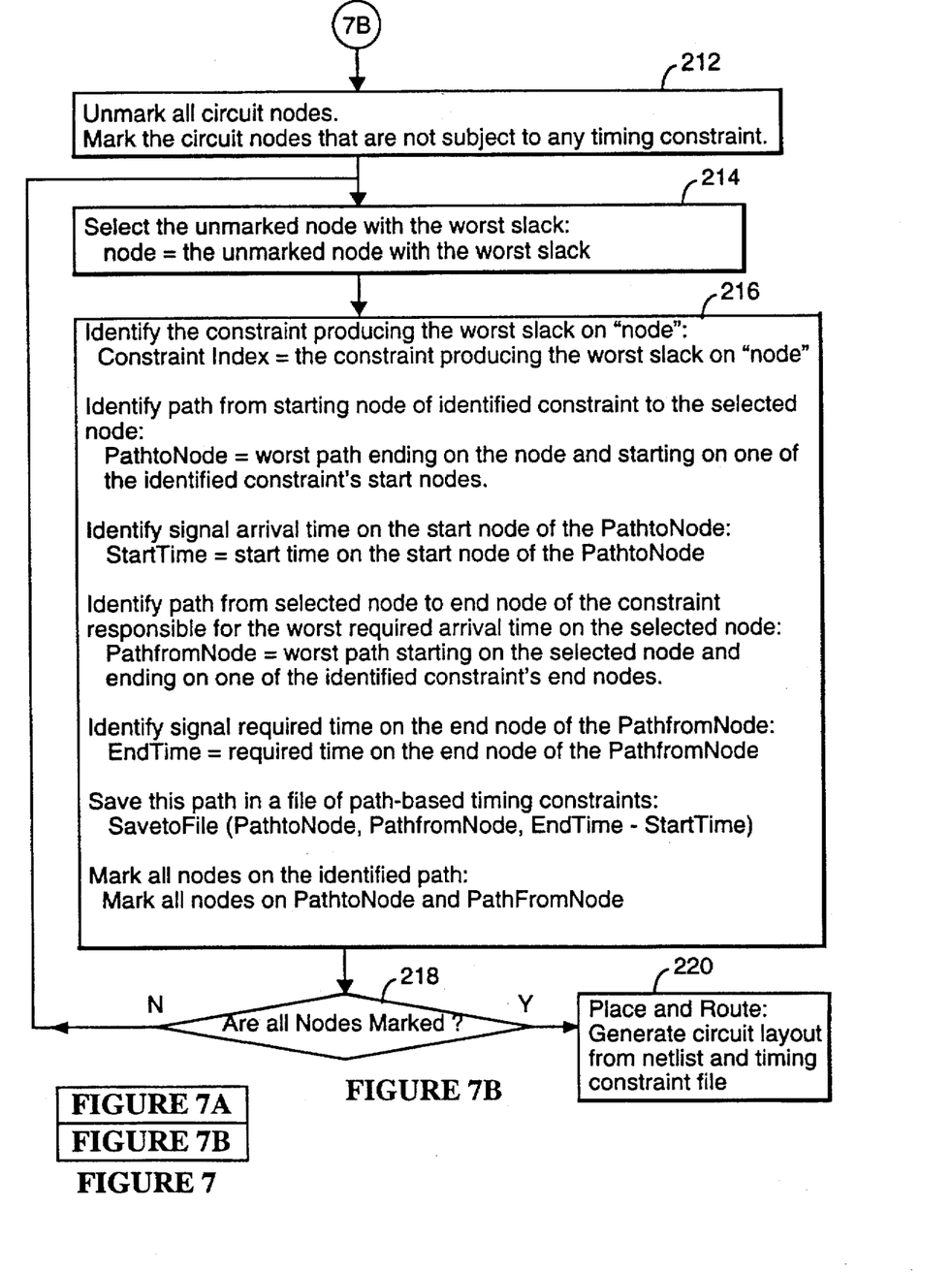

Referring to FIG. 7, the path-based timing constraint generation procedure (performed by the netlist annotator 118) begins by receiving the circuit netlist, the system level timing constraints, and a cell library specification (step 200). The system level timing constraints are assigned "constraint indices", starting with an index value of 1, and increasing by 1 for each additional timing constraint. The constraint indices are used to identify the constraints responsible for various computed signal arrival times.

Each of the timing "propagation" steps and delay computation steps mentioned below are performed by making corresponding calls to the timing verifier 120, which in turn retrieves signal delay information from the cell library 116 in order to compute signal delays on various arcs through the circuit elements in the specified circuit.

For each system level timing constraint, the procedure stores in the node data structures start times for each start node and required times for each end node (202). Thus, if input node X is among the start nodes for the first two timing constraints, it will have the following entries in its node data structure:

arrTimes[1]: start time 1 arrArcs[1]: none arrTimes[2]: start time 2 arrArcs[2]: none

Then, for each system level timing constraint, the arrival times and required times are propagated through the circuit (step 204). In particular, for each system level timing, starting with the constraint's start nodes, the procedure propagates signal arrival times through the circuit and determines the worst (i.e., latest) signal arrival time of signals for all circuit nodes downstream of the constraint's start nodes. These signal arrival times are computed based on signal delay information in the specified cell library. Since there may be several time constraints, some nodes in the circuit may have several signal arrival times which are stored in their respective node data structures in the arrTimes array at array positions corresponding to the constraint indices of the corresponding timing constraints:

| | |
|---|---|
| arrTimes[1] : | worst signal arrival time, if any, based on start signals associated with constraint 1 |
| arrTimes[2] : | worst signal arrival time, if any, based on start signals associated with constraint 2 |
| ... | |

For each node and each timing constraint, the corresponding upstream pin-to-pin arc (i.e., an adjacent arc that is closer to the input nodes) that induces that worst case arrival time is stored in the arrArcs array:

| | |
|---|---|
| arrArcs[1] : | pin-to-pin arc inducing the worst signal arrival time, if any, associated with constraint 1 |
| arrArcs[2] : | pin-to-pin arc inducing the worst signal arrival time, if any, associated with constraint 2 |
| ... | |

Next (step 206), for each system level timing constraint, starting with the constraint's end nodes, the procedure back propagates the required arrival times for each circuit node upstream of the constraint's end nodes. The procedure then determines for each timing constraint the worst (i.e., earliest) required arrival time of signals for each of the circuit nodes upstream of the constraint's end nodes. These required signal arrival times are computed using signal delay information in the specified cell library. Since there may be several time constraints, some nodes in the circuit may have several required signal arrival times which are stored in their respective node data structures in the reqTimes array at array positions corresponding to the constraint indices of the corresponding timing constraints:

| | |
|---|---|
| reqTimes[1] : | worst signal required time, if any, based on end signals associated with constraint 1 |
| arrTimes[2] : | worst signal required time, if any, based on end signals associated with constraint 2 |
| . . . | |

For each node and each timing constraint, the corresponding downstream pin-to-pin arc (i.e., an adjacent arc that is closer to the end nodes) that induces that worst case required arrival time is stored in the reqArcs array:

| | |
|---|---|
| reqArcs[1] : | pin-to-pin arc inducing the worst signal required time, if any, associated with constraint 1 |
| reqArcs[2] : | pin-to-pin arc inducing the worst signal required time, if any, associated with constraint 2 |
| . . . | |

At step 208, for each node that has at least one non-empty slot in the arrTimes array, the procedure computes the slack for each constraint that affects the node. The slack is equal to the worst required arrival time (for a particular timing constraint) minus the worst arrival time (for the same timing constraint). The procedure selects the worst (i.e., most negative) of those slack values, stores that worst slack value in the "slack" entry 165 of the corresponding node data structure, and stores the index of the timing constraint the "produced" that worst slack in the "constraint index" entry 166 of the node data structure.

At this point of the procedure, all the information needed to generate the path-based timing constraints has been loaded into the node data structures. All that remains to be done is to extract the path-based timing constraints in such a way that a minimum set of such path-based timing constraints are generated, while using all the relevant timing information in the node data structures.

At step 212, the "mark" fields 167 in all node data structures are unmarked (e.g., a zero is stored in each mark field). Then all the node data structures are inspected to locate those nodes that are not the subject of any timing constraints, that is those node data structures which have no arrTimes or no reqTimes values, and those nodes are "marked" by storing a non-zero value in the mark field 167 of the corresponding node data structures. Path-based timing constraints are generated only for unmarked nodes.

Next, the procedure selects an unmarked node with the worst (i.e., most negative) slack (step 214). If several nodes have slack values equal to the worst slack, any one of those nodes is selected.

At step 216, the constraint index associated with the worst slack on the selected node is identified from the "constraint index" field 166 in the selected node's data structure 116. Then the path, called the PathToNode, from a starting node of the identified constraint to the select node is generated. The PathToNode is the worst path ending on the node and starting on one of the identified constraint's start nodes.

The PathToNode is extracted from the node data structures as follows. For the selected node, the arrArcs( ) entry for the identified constraint represents a first arc of the path, and identifies an upstream node on the path. Then the node data structure of the upstream node is inspected for the arrArcs( ) entry for the identified constraint so as to identify the next upstream node on the path. This process continues until a start node of the constraint is reached. The resulting sequence of nodes is reversed to produce a sequence of nodes going from a start node to the selected node, and that sequence of nodes is the PathToNode.

The start time on the start node of the PathToNode is stored in a variable called StartTime.

Next, a path called PathFromNode from the selected node to an end node of the identified constraint is generated. The PathFromNode is extracted from the node data structures as follows. For the selected node, the reqArcs( ) entry for the identified constraint represents a first arc of the path, and identifies a downstream node on the path. Then the node data structure of the downstream node is inspected for the reqArcs( ) entry for the identified constraint so as to identify the next downstream node on the path. This process continues until an end node of the identified constraint is reached. The resulting sequence of nodes is the PathFromNode.

The end time on the end node of the PathFromNode is stored in a variable called EndTime. A worst case path traversal time is computed as the difference between the EndTime and the StartTime.

The signal path represented by the concatenation of PathToNode and PathFromNode, and that path is stored in the path-based timing constraint file 122 along with the worst case traversal time for that path:

FileRecord=PathToNode, PathFromNode, EndTime−StartTime

Step 216 is concluded by marking all the nodes in the identified path (by storing non-zero values in the mark field 167 of their respective node data structures.

Then, if at least one node remains unmarked (step 218), the procedure resume at step 214 with the selection of an unmarked node with worst slack. The procedure continues until all nodes have been marked.

It is noted, however, that a relatively small number of path-based timing constraints may generated, since each timing constrained node needs to be included in only one path-based timing constraint. When a node is included in more than one path-based timing constraint, only one of those paths represents the most critical timing constraint for that node, while the other identified paths of which it is a member are based on the most critical timing constraints of other nodes.

When all nodes have been marked, the resulting file of path-based timing constraints is passed to a silicon compiler, along with the circuit netlist. The silicon compiler places and routes the elements of the specified circuit (step 220) so as to generate a circuit layout 126 that satisfies the timing constraints specified in the path-based constraint file 122, or an error message if it is unable to generate a circuit layout meeting those timing constraints.

EXAMPLE

Referring to the circuit shown in FIG. 6, assume that we are given a single system level timing constraint: an arrival time of 0 nanoseconds on all external inputs and a required arrival time of 2 nanoseconds on all the external outputs.

The initial representation of timing constraints in the node data structures (step 202) would be as follows:

| node n1 | |
|---|---|
| arrTimes[1] | : 0. ns |
| arrArcs[1] | : none |
| reqTimes[1] | : not yet set |
| reqArcs[1] | : not yet set |

```
node n2 arrTimes[1]    : not yet set
arrArcs[1]     : not yet set
reqTimes[1]    : not yet set
reqArcs[1]     : not yet set
node n3 arrTimes[1]    : not yet set
arrArcs[1]     : not yet set
reqTimes[1]    : 2. ns
reqArcs[1]     : none
node n4 arrTimes[1]    : not yet set
arrArcs[1]     : not yet set
reqTimes[1]    : 2. ns
reqArcs[1]     : none
node n5 arrTimes[1]    : 0. ns
arrArcs[1]     : none
reqTimes[1]    : not yet set
reqArcs[1]     : not yet set
```

Propagation of signal arrival times through the entire circuit, assuming a two nanosecond pin-to-pin timing for all gates (step 204), generates the following node data structure entries:

```
node n1 arrTimes[1]    : 0. ns
arrArcs[1]     : none
reqTimes[1]    : not yet set
reqArcs[1]     : not yet set
node n2 arrTimes[1]    : 2. ns
arrArcs[1]     : gate u1 i1-to-o1 arc
reqTimes[1]    : not yet set
reqArcs[1]     : not yet set
node n3 arrTimes[1]    : 4. ns
arrArcs[1]     : gate u2 i2-to-o1 arc
reqTimes[1]    : 2. ns
reqArcs[1]     : none
node n4 arrTimes[1]    : 6. ns
arrArcs[1]     : gate u3 i1-to-o1 arc
reqTimes[1]    : 2. ns
reqArcs[1]     : none
node n5 arrTimes[1]    : 0. ns
arrArcs[1]     : none
reqTimes[1]    : not yet set
reqArcs[1]     : not yet set
```

Back propagation of the required times through the entire specified circuit, assuming two nanosecond pin-to-pin timing for all gates (step 206), generates the following node data structure entries:

```
node n1 arrTimes[1]    : 0. ns
arrArcs[1]     : none
reqTimes[1]    : -2. ns
reqArcs[1]     : gate u2 i1-to-o1 arc
node n2 arrTimes[1]    : 2. ns
arrArcs[1]     : gate u1 i1-to-o1 arc
reqTimes[1]    : -2. ns
reqArcs[1]     : gate u2 i2-to-o1 arc
node n3 arrTimes[1]    : 4. ns
arrArcs[1]     : gate u2 i2-to-o1 arc
reqTimes[1]    : 0. ns
reqArcs[1]     : gate u3 i1-to-o1 arc
node n4 arrTimes[1]    : 6. ns
arrArcs[1]     : gate u3 i1-to-o1 arc
reqTimes[1]    : 2. ns
reqArcs[1]     : none
node n5 arrTimes[1]    : 0. ns
arrArcs[1]     : none
reqTimes[1]    : -4. ns
reqArcs[1]     : gate u1 i1-to-o1 arc
```

The next step (208) to is to compute the slacks on all the nodes, and to keep the worst one as well as the index of the constraint producing that worst slack. This produces the following node data structure entries:

```
node n1 slack              : -2ns (= -2 -0)
constraint index   : 1
node n2 slack              : -4ns (= -2 -2)
constraint index   : 1
node n3 slack              : -4 ns (= 0 -4)
constraint index   : 1
node n4 slack              : -4 ns (= 2 -6))
constraint index   : 1
node n5 slack              : -4 ns (= -4)
constraint index   : 1
```

In the remaining steps (214, 216), the procedure selects a worst slack node, such as node n3 (n2, n5 or n4 would produce the same results). The path-based constraint generated using n3 as the first selected node is First path-based timing constraint="n5, n2, n3, n4; 2ns".

The remaining worst slack node is n1, and the corresponding path-based timing constraint that is generated is Second path-based timing constraint="n1, n3; 2ns".

At this point, all node have been marked, and thus all path-based timing constraints have been generated. The path-based timing constraints the circuit netlist would then be passed to a silicon compiler.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of synthesizing an integrated circuit, the steps of the method comprising:

(A) receiving and storing in a computer memory a netlist denoting a list of components in said integrated circuit and a set of nodes interconnecting said components; each said component of said integrated circuit having at least one input port and at least one output port, said set of nodes including a set of circuit input nodes and circuit output nodes for said integrated circuit;

(B) receiving and storing in a computer memory a plurality of system level timing constraints, said system level timing constraints representing maximum delay times for signals to propagate from input nodes to output nodes of said integrated circuit;

(C) receiving cell delay data representing signal delays associated with said components in said integrated circuit;

(D) for each system timing constraint, storing data for nodes downstream of input nodes associated with said each system timing constraint and for nodes upstream of output nodes associated with said each system timing constraint, said stored data indicative of slack at said nodes with respect to each said system timing constraint;

(E) repeatedly generating successive path-based timing constraints, until all nodes for which slack indicative data has been stored are included in at least one path-based timing constraint, each path-based timing constraint being generated by:

(E1) selecting a node, not included in any previously generated path-based timing constraint, with a worst slack represented in said stored data;

(E2) identifying which system level timing constraint corresponds to a worst slack associated with said selected node; and (E3) identifying a signal path from a start node associated with said identified system level timing constraint through said selected node to an end node associated with said identified system level timing constraint, determining a path traversal time for said identified signal path-based on said stored data, and outputting said identified signal path and path traversal time as one of said path-based timing constraints; and (F) passing said netlist and output path-based timing constraints to a silicon compiler and automatically placing/routing a circuit in according with said netlist and path-based timing constraints.

2. A method of synthesizing an integrated circuit, the steps of the method comprising:

(A) receiving and storing in a computer memory a netlist denoting a list of components in said integrated circuit and a set of nodes interconnecting said components; each said component of said integrated circuit having at least one input port and at least one output port, said set of nodes including a set of circuit input nodes and circuit output nodes for said integrated circuit;

(B) receiving and storing in a computer memory a plurality of system level timing constraints, said system level timing constraints representing maximum delay times for signals to propagate from respective ones of said input nodes to respective ones of said output nodes of said integrated circuit;

(C) receiving cell delay data representing signal delays associated with said components in said integrated circuit;

(D) for each system timing constraint, generating signal arrival time data for nodes downstream of input nodes associated with said each system timing constraint and signal required time data for nodes upstream of output nodes associated with said each system timing constraint, and generating slack data indicative of differences between said generated signal arrival time and signal required time at said nodes with respect to each said system timing constraint;

(E) repeatedly generating successive path-based timing constraints, until all nodes for which slack indicative data has been stored are included in at least one path-based timing constraint, each path-based timing constraint being generated by:

(E1) selecting a node, not included in any previously generated path-based timing constraint;

(E2) identifying which system level timing constraint corresponds to a worst slack associated with said selected node; and (E3) identifying a signal path from a start node associated with said identified system level timing constraint through said selected node to an end node associated with said identified system level timing constraint, determining a path traversal time for said identified signal path-based on said stored data, and outputting said identified signal path and path traversal time as one of said path-based timing constraints; and (F) passing said netlist and output path-based timing constraints to a silicon compiler and automatically placing/routing a circuit in according with said netlist and path-based timing constraints.

3. A computer aided circuit design system for synthesizing an integrated circuit, comprising:

(A) a computer memory;

(B) a netlist stored in said computer memory, said netlist denoting a list of components in said integrated circuit and a set of nodes interconnecting said components; each said component of said integrated circuit having at least one input port and at least one output port, said set of nodes including a set of circuit input nodes and circuit output nodes for said integrated circuit;

(C) a plurality of system level timing constraints stored in said computer memory, said system level timing constraints representing maximum delay times for signals to propagate from respective ones of said input nodes to respective ones of said output nodes of said integrated circuit;

(D) cell delay data stored in said computer memory, said cell delay data representing signal delays associated with said components in said integrated circuit;

(E) a node annotator procedure, executed by said computer system, for processing for each system timing constraint, said node annotator procedure processing said stored netlist and cell delay data to generate signal arrival time data for nodes downstream of input nodes associated with said each system timing constraint and signal required time data for nodes upstream of output nodes associated with said each system timing constraint, and to generate slack data indicative of differences between said generated signal arrival time and signal required time at said nodes with respect to each said system timing constraint;

(F) said node annotator procedure including path-based timing constraint generation instructions for repeatedly generating successive path-based timing constraints, until all nodes for which slack indicative data has been stored are included in at least one path-based timing constraint, said path-based timing constraint generation instructions including instructions for:

(F1) selecting a node, not included in any previously generated path-based timing constraint;

(F2) identifying which system level timing constraint corresponds to a worst slack associated with said selected node; and (F3) identifying a signal path from a start node associated with said identified system level timing constraint through said selected node to an end node associated with said identified system level timing constraint, determining a path traversal time for said identified signal path-based on said stored data, and outputting said identified signal path and path traversal time as one of said path-based timing constraints; and (G) a silicon compiler and automatically placing/routing a circuit in according with said netlist and path-based timing constraints.

* * * * *